United States Patent [19]

Vaughan et al.

[11] 4,340,573
[45] * Jul. 20, 1982

[54] PREPARATION OF ZEOLITES

[75] Inventors: David E. W. Vaughan, Columbia; Grant C. Edwards, Silver Spring; Michael G. Barrett, Laurel, all of Md.

[73] Assignee: W. R. Grace & Co., New York, N.Y.

[*] Notice: The portion of the term of this patent subsequent to Dec. 11, 1996, has been disclaimed.

[21] Appl. No.: 211,888

[22] Filed: Jan. 9, 1980

Related U.S. Application Data

[63] Continuation of Ser. No. 731, Jan. 3, 1979, abandoned, which is a continuation-in-part of Ser. No. 880,194, Feb. 22, 1978, abandoned, which is a continuation-in-part of Ser. No. 822,310, Aug. 5, 1977, abandoned, which is a continuation of Ser. No. 742,943, Nov. 18, 1976, abandoned, which is a continuation of Ser. No. 653,695, Jan. 30, 1976, abandoned.

[51] Int. Cl.$^3$ ............................................. C01B 33/26
[52] U.S. Cl. ................................ 423/328; 252/317; 423/329
[58] Field of Search ............................ 423/328–330; 252/455 Z, 317, 182, 188.3 R

[56] References Cited

U.S. PATENT DOCUMENTS

| | | | |
|---|---|---|---|
| 3,433,589 | 3/1969 | Ciric | 423/329 |
| 3,574,538 | 4/1971 | McDaniel et al. | 423/329 |
| 3,639,099 | 2/1972 | Elliott et al. | 423/329 |
| 3,671,191 | 6/1972 | Maher et al. | 423/329 |
| 3,808,326 | 4/1974 | McDaniel et al. | 423/329 |
| 4,178,352 | 12/1979 | Vaughan et al. | 423/329 |

*Primary Examiner*—Edward J. Meros
*Attorney, Agent, or Firm*—Arthur P. Savage

[57] ABSTRACT

Synthetic crystalline alumino-silicate zeolites are prepared by combining reactant quantities of alumina, silica, sodium hydroxide and water with zeolite-forming alumino-silicate seeds having the composition 16 $Na_2O$: 2 to 9 $Al_2O_3$: 15 $SiO_2$: 500 to 2000 $H_2O$. The seed compositions may be used to produce Type A, X and Y crystalline alumino-silicate zeolites.

3 Claims, No Drawings

PREPARATION OF ZEOLITES

This application is a continuation of U.S. Ser. No. 000,731 filed Jan. 3, 1979, now abandoned, which is a continuation-in-part of U.S. Ser. No. 880,194 filed Feb. 22, 1978 now abandoned, which is a continuation-in-part of U.S. Ser. No. 822,310 filed Aug. 5, 1977, now abandoned, which is a continuation of U.S. Ser. No. 742,943 filed Nov. 18, 1976, now abandoned, which in turn is a continuation of U.S. Ser. No. 653,695 filed Jan. 30, 1976, now abandoned.

The present invention relates to an improved method for preparing crystalline alumino-silicate zeolites, and more specifically to novel zeolite-forming seed compositions, sometimes referred to as zeolitic nucleation center compositions, which may be used to quickly and efficiently produce crystalline alumino-silicate zeolites from inexpensive raw materials.

It is generally known that crystalline alumino-silicates of the A, X and Y types can be conveniently produced by combining zeolite precursor reaction mixtures comprising silica, alumina, sodium hydroxide and water with finely divided zeolitic "seed" mixtures which promote crystalline zeolite formation.

U.S. Pat. Nos. 3,808,326 to McDaniel et al., and 3,639,099 to Elliott et al. describe zeolite preparation methods wherein a minor quantity of zeolite forming seed mixture is added to required reactant quantities of silica, alumina, water and sodium hydroxide. The processes disclosed in these references generally require the use of excess reactants, particularly excess soda and silica, and in addition require relatively large volumes of seed compositions.

In recent years considerable emphasis has been placed on the development of industrial processes which decrease or minimize the output of pollution contributing effluents and maximize utilization of raw materials. The production of commercial quantities of zeolites by prior art processes which have frequently required the use of excess reactants (sodium hydroxide and silicates in particular) has required the use of expensive pollution control measures.

It is therefore an object of the present invention to provide an improved zeolite synthesis process by which a variety of crystalline alumino-silicate zeolites may be rapidly and efficiently produced.

It is a further object to provide a process for preparing zeolites wherein the quantities of excess sodium hydroxide which results from the process is minimized. This in turn minimizes the amount of acid needed to neutralize the effluent.

It is yet another object to provide an improved, highly active zeolite-forming seed composition which may be used to efficiently promote zeolite formation while reducing the overall quantity of excess seed composition normally required to produce zeolite.

These and still further objects of the present invention will become readily apparent to one skilled in the art in the following detailed description and specific examples.

Broadly, our invention contemplates the preparation of crystalline aluminosilicate zeolites by a process which includes the use of a zeolite forming seed composition which comprises the following mol ratio of ingredients: $16Na_2O:2$ to $9Al_2O_3:15SiO_2:500$ to $2000H_2O$.

More specifically, we have found that a variety of zeolites may be efficiently prepared by use of a zeolite-forming seed composition which contains a high alumina ($Al_2O_3$) to silica ($SiO_2$), and alumina to soda ($Na_2O$) ratio which is prepared by:

1. Combining sodium silicate and sodium aluminate and water to obtain a mixture having the following mol ratio of ingredients: $16Na_2O:2$ to $9Al_2O_3:15SiO_2:300$ to $340H_2O$.
2. Aging the composition to promote the formation of stable nuclei.
3. Vigorously agitating the mixture to avoid the formation of a hard, non-dispersible gel.
4. Adding additional water to obtain a stable, dispersible, highly active zeolite-forming seed composition which contains the following mol ratio of ingredients: $16Na_2O:2$ to $9Al_2O_3:15SiO_2:500$ to $2000H_2O$.

This seed composition may be combined with reactive ratios of silica, alumina, sodium hydroxide and water, which are known to produce synthetic crystalline alumino-silicate zeolites such as Type A, X and Y zeolites. In a particular preferred procedure, the zeolite-forming seed compositions contemplated herein are used to produce Type Y zeolite in the two-stage process described in our copending application Ser. No. 944,557 filed Sept. 21, 1978, now U.S. Pat. No. 4,178,352, wherein an initial reaction mixture which contains the zeolite crystallization seeds is prepared which contains the following mol ratios: 2 to $6 Na_2O:4.5$ to $11 SiO_2:Al_2O_3:30$ to $200H_2O$. The initial reaction mixture is then adjusted by the addition of aluminum sulfate and/or sulfuric acid to yield a second-stage reaction mixture which contains the following ratios: 0.5 to $2.5Na_2SO_4:1.2$ to $3.0Na_2O:1.0Al_2O_3:4.5$ to $7.5SiO_2:40$ to $200H_2O$.

The presently contemplated zeolite forming seed compositions are conveniently prepared by combining a sodium silicate solution with a sodium aluminate solution along with required amounts of water and sodium hydroxide. The sodium silicate solution may comprise sodium silicate, having the ratio of soda to silica of 0.28 to $2Na_2O:SiO_2$ dissolved in water in amounts ranging from 2 to 40 percent by weight. The sodium aluminate solution is conveniently prepared by combining sodium hydroxide solution with alumina trihydrate in quantities to produce a ratio of soda to alumina of 1.2 to $1.8Na_2O:Al_2O_3$ in amounts ranging from about 5 to 45 percent by weight solids.

To obtain from the seeds the required quantities of silicate, aluminate and sodium hydroxide solution are combined as follows: Sodium aluminate solution is prepared and cooled to a temperature of about $-10°$ to $40°$ C. The sodium aluminate solution is then combined with the sodium silicate solution with rapid stirring to produce a gelled reaction mixture. The reaction mixture is agitated and held at a temperature of from about $10°$ to $80°$ C. for a period of about ¼ to 96 hours. Subsequent to this reaction period, the zeolite seed preparation is diluted with water to produce a mixture which contains about 10 to 16 weight percent solids and held for ¼ to 96 hours at $10°$ to $60°$ C. This diluted seed mixture is ready for use in the production of a variety of zeolites. To utilize the zeolite forming seed composition, from about 0.1 to 10 percent of the alumina present in a typical zeolite-forming reaction mixture is provided by alumina present in the seed composition. Typical zeolite-forming reaction ratios are as follow:

When zeolite A is to be produced, an overall reaction ratio of 1.1 to $2.3Na_2O:1.8$ to $2.2SiO_2:Al_2O_3:40$ to $120H_2O$ is utilized.

Where zeolite X is to be produced, the following ratio of ingredients is utilized; 1.3 to 5.4Na$_2$O:2.6 to 4.1SiO$_2$:Al$_2$O$_3$:60 to 300H$_2$O.

In the event Type Y zeolite is to be produced, the following overall ratio of ingredients may be utilized; 1.2 to 9Na$_2$O:4.5 to 20SiO$_2$:Al$_2$O$_3$:40 to 400H$_2$O.

By using the presently disclosed novel zeolite-forming seed compositions which contain a high percentage of alumina when compared to typical prior art seed compositions, it is found that the overall quantity of soda (Na$_2$O) in the slurry is reduced. This is due to the fact the conventional zeolite seed composition contains a high Na$_2$O to Al$_2$O$_3$ ratio, while the addition of our novel seed composition lessens the quantity of soda contributed thereby to the overall zeolite reaction mixture. Furthermore, it is found that the presently contemplated zeolite-forming seed compositions are more active than prior art seed compositions. Accordingly, less is required to produce a given quantity of the zeolite.

Having described the basic aspects of the present invention, the following examples are given to illustrate the specific embodiments of our invention.

EXAMPLE 1

This example illustrates a method of preparing the nucleation centers and the steps necessary for using these steps to initiate reaction. Sodium aluminate solutions were prepared by dissolving various quantities of alumina trihydrate (Al$_2$O$_3$.3 H$_2$O) in a boiling solution of 153 g. of sodium hydroxide in 300 ml. of water. The solution was cooled to room temperature and added with rapid stirring to a mixture of 521 g. of sodium silicate (41° Be'; 1.0Na$_2$O:3.22SiO$_2$) in 291 ml. of water. The product of preparations 2, 3, 4 and 5 set to a stiff gel within 2 to 10 minutes after mixing was completed. The nucleation centers had the following oxide ratios: 16Na$_2$O:2-8Al$_2$O$_3$:15SiO$_2$:320H$_2$O.

| Preparation No. | Al$_2$O$_3$ . 3H$_2$O (g) | Al$_2$O$_3$ (mols) |
| --- | --- | --- |
| (1) | 52 | 2.0 |
| (2) | 78 | 3.0 |
| (3) | 104 | 4.0 |
| (4) | 156 | 6.0 |
| (5) | 208 | 8.0 |

These nucleation centers may be prepared for use by diluting with water to form a pourable slurry having the oxide ratio of 16Na$_2$O:2-8Al$_2$O$_3$:15SiO$_2$:500 to 2000H$_2$O.

EXAMPLE 2

This example illustrates a method of preparing a zeolite from a reaction slurry having the following ratios of reactants: 1.9Na$_2$O:Al$_2$O$_3$:6SiO$_2$:100H$_2$O.

A reaction mixture was prepared by mixing 155 g. of the nucleation centers prepared in Example 1, Preparation No. (3) diluted with water to form a composition of 16Na$_2$O:2Al$_2$O$_3$:15SiO$_2$:640H$_2$O with 438 g. of a 41° Be' sodium silicate, having a silica SiO$_2$ to Na$_2$O ratio of 3.25, and 104 g. of sodium aluminate solution containing 17.9 weight percent Na$_2$O and 22 weight percent alumina. 99 g. of water was added to the mixture. The mixture was stirred vigorously and 163 of an alum solution [Al$_2$(SO$_4$)$_3$] containing 8.3 weight percent of alumina was added to the mixture. The mixture was then heated at a temperature of 100° C. After 9 hours the product was filtered, washed and evaluated. The analysis of the product was as follows:

| | |
| --- | --- |
| Na$_2$O | 12.8% |
| SiO$_2$ | 63.9% |
| Al$_2$O$_3$ | 23.3% |

The silica alumina ratio of the product was 4.65. The product had a surface area of 840 m$^2$/g indicating a highly crystalline zeolite, and the X-ray diffraction analysis showed an excellent pattern characteristic of zeolite Y.

EXAMPLE 3

This example illustrates the method of preparing a zeolite from a reactant mixture having the following ratio of reactants: 1.8Na$_2$O:Al$_2$O$_3$:6SiO$_2$:100H$_2$O.

In this preparation of 155 g. of the diluted nucleation center mixture prepared in accordance with the process described in Example 1 (3) were blended into 437 g. of a 41° Be' sodium silicate having a silica to Na$_2$O ratio of 3.25; then 95 g. H$_2$O and sodium aluminate (100 g.) solution containing 17.9 percent Na$_2$O and 22 weight percent Al$_2$O$_3$ were added slowly followed by the addition of 172 g. of an alum solution containing 28.06 weight percent Al$_2$(SO$_4$)$_3$. After thoroughly mixing, the slurry was aged for 16 hours at 100° C. The product was cooled, filtered, washed and analyzed. The analysis of the product was as follows: Na$_2$O

| | |
| --- | --- |
| Na$_2$O | 12.6% |
| Al$_2$O$_3$ | 22.2% |
| SiO$_2$ | 64.9% |

The product has a silica to alumina ratio of 4.96 and a nitrogen surface area of 820 m$^2$/g. The product had an X-ray diffraction pattern characteristic of a Y-type zeolite of high purity.

EXAMPLE 4

This example illustrates the method of preparing a faujasite from a slurry having a composition of 1.6Na$_2$O:Al$_2$O$_3$:5.6SiO$_2$:100H$_2$O.

A slurry of nucleation centers was prepared using the general process of Example 1 (3) to have a composition of 16Na$_2$O:2Al$_2$O$_3$:15SiO$_2$:500H$_2$O. The nucleation centers (139 g.) were mixed with 544 g. of 41° Be' sodium silicate having a silica to sodium oxide ratio of 3.25 and 132 g. of sodium aluminate containing 18 percent Na$_2$O and 22 percent alumina. A total of 194 g. of water was added. An alum solution was prepared to contain 8.4 percent Al$_2$(SO$_4$)$_3$ and 240 g. of the solution was rapidly blended into the slurry. The mixture was homogenized for a period of 15 minutes. The slurry was heated at 100° C. for 6 hours, filtered, washed and analyzed. The product recovered was a high purity faujasitic zeolite having a silica to alumina ratio of 4.2 and a nitrogen surface area of 850 m$^2$/g.

EXAMPLE 5

This example illustrates the method for preparing a zeolite from a reactant slurry having the following ratios of reactants: 1.35Na$_2$O:Al$_2$O$_3$:5.2SiO$_2$:55H$_2$O.

A nucleation center slurry was prepared to contain 16Na$_2$O:2Al$_2$O$_3$:15SiO$_2$:800H$_2$O using the general procedure described in Example 1. The slurry was cold aged for 3 weeks and then 413 g. of the slurry of nucleation centers were added to a slurry comprising 173 g. of metakaolin, 476 g. of sodium silicate having a silica to Na₂O ratio of 3.25. Water (130 g.) was then added. After hot aging the mixture for 16 hours at a temperature of 100° C. the product was filtered from the mother liquor, washed and analyzed. The product was a high purity faujasitic zeolite having a silica to alumina ratio of 4.30 and a nitrogen surface area of 850 m²/g.

EXAMPLE 6

In this example a diluted slurry of nucleation centers having the composition $16Na_2O:2Al_2O_3:15SiO_2:640H_2O$ was used to prepare a zeolite. The synthesis slurry was prepared by mixing 185 g. of the diluted nucleation centers and 1083 g. of sodium silicate having a Na₂O to SiO₂ ratio of 3.22. Then 269 g of a sodium aluminate solution, which was prepared to contain 18.5 percent Na₂O and 21 percent alumina, was blended with 369 g. of water and added to the synthesis slurry and mixed well. Finally 360 g. of an aluminum sulfate solution containing 8.3% alumina was added, and the slurry was thoroughly blended. The mixture had an oxide ratio of $1.9Na_2O:Al_2O_3:6SiO_2:100H_2O$, but the seeds supplied only 3 percent of the slurry alumina rather than the usual 5-6 percent. The resultant slurry was heated at 100° C. for 12 hours. The product had a surface area of 695 m²/g, a silica to alumina ratio of 4.6, and an X-ray pattern characteristic of zeolite Y. This example shows that high alumina seeds are quite active at the 3 percent addition level.

EXAMPLE 7

In this example a slurry of nucleation centers was prepared using the process described in Example 1(1). The product had the oxide ratio of $16Na_2O:2Al_2O_3:15SiO_2:320H_2O$. The nucleation centers were used to prepare a synthetic faujasite by adding the nucleation centers without dilution to a synthesis slurry having an oxide ratio of $1.9Na_2O:Al_2O_3:6SiO_2:100H_2O$. The slurry was prepared by mixing 32 g. of the nucleation centers which corresponds to 1.25 weight percent of the total slurry alumina with 820 g. of sodium silicate having an Na₂O to SiO₂ ratio of 3.22. A sodium aluminate solution was prepared to contain 18.4 percent Na₂O and 20.3 percent Al₂O₃, and 224 g. of this solution was mixed with the sodium silicate-nucleation center mixture.

An aluminum sulfate solution was prepared to contain 8.37 percent alumina and 259 g. of this solution was added to the slurry along with 348 g. of water. The slurry was heated for 10 hours at 100° C. The product recovered had a silica to alumina ratio of 4.4, a surface area of 700 m²/g and gave an X-ray diffraction pattern characteristic of zeolite Y. This example demonstrates that a relatively small amount of nucleation centers gives a good yield of the product.

EXAMPLE 8

This example illustrates the conversion of a slurry having a composition of $1.0Na_2O:Al_2O_3:4.3SiO_2:50H_2O$ to a faujasite product with a composition (dry basis) $1Na_2O:Al_2O_3:4.3SiO_2$: thereby effecting complete stoichiometric conversion of the reactants.

A slurry of nucleation centers was prepared using the general process of Example 1 (1) to have a composition of $16Na_2O:2Al_2O_3:15SiO_2:800H_2O$. The nucleation centers (413 g.) were mixed with 422 g. 41.2° Be' sodium silicate having a silica to sodium oxide ratio of 3.25. To this was added a slurry of 218 g. matakaolin in 275 gm. water. After hot aging at 100° C. for 24 hours the sample was filtered, washed and analyzed. The product was a high purity faujasite having a silica to alumina ratio of 4.3 and a nitrogen surface area of 770 m²/g. The filtrate was titrated with 0.1 N HCl and was found to be 0.04 N NaOH, demonstrating the complete utilization of Na₂O and SiO₂.

EXAMPLE 9

Sodium Type A zeolite (NaA) was synthesized from seeded slurries having the oxide ratio of $2.1Na_2O:1Al_2O_3:1.9SiO_2:80H_2O$ using 2.0, 6.0 and 8.0 Al₂O₃ seeds as follows. Example E is included as a control for the seeding effect on the crystallization time for NaA zeolite.

These were mixed in the order
a. sodium silicate solution plus water (Na₂O=90 wt. % and SiO₂=28.8 wt. %)
b. then seeds were blended into the above
c. next sodium aluminate solution (Na₂O=18.1 wt. % and Al₂O₃=19.6 wt. %) was mixed in
d. finally, aluminum sulfate solution (Al₂O₃=8.3 wt. %+SO₃=19.5 wt. %) was added (if required) with thorough stirring.

The slurries were transferred to one liter resin kettles which were fitted into heating mantles and covered with lids leading into reflux condensers. The slurries were heated to 100°±2° C. with rapid stirring to homogenize the mixture; after 100°±2° C. was reached, the stirrers were turned to low speed. NaA was formed in one-half to one hour in the seeded slurries, while the non-seeded slurry required two hours to produce good quality NaA.

| Example | Seeds Al₂O₃ (mols) | % Seeding (mol % Al₂O₃) | Seeds, g. | Sodium Aluminate Soln., g. | Sodium Silicate Soln., g. | Water, g. | Aluminum Sulfate Soln., g. | Hours At 100° C. | NaA % Crystallinity |
|---|---|---|---|---|---|---|---|---|---|
| 9A | 2 | 3 | 59 | 253 | 174 | 411 | — | 1 | 103 |
| 9B | 2 | 10 | 194 | 211 | 120 | 330 | 57 | 1 | 106 |
| 9C | 6 | 2 | 14 | 255 | 192 | 432 | — | ½ | 100 |
| 9D | 8 | 2 | 11 | 255 | 194 | 434 | — | ½ | 103 |
| 9E | non-seeded | 0 | 0 | 261 | 198 | 434 | — | 1 | 36 |
| 9E | non-seeded | 0 | 0 | | | | | 2 | 108 |

EXAMPLE 10

Sodium Type Y zeolite (NaY) was made from seeded $7Na_2O:1Al_2O_3:16SiO_2:280H_2O$ and $3.1Na_2O:1Al_2O_3:9SiO_2:130H_2O$ slurries using high alumina seeds. The chemicals were mixed as follows for the 7:1:16:280 slurries.

a. A sodium aluminate solution was made by dissolving the NaOH in twice its weight of water; then the alumina trihydrate was dissolved in the resulting sodium hydroxide solution by boiling. After the alumina trihydrate dissolved, the same amount of water as was originally used for the sodium hydroxide solution was added.

b. The sodium silicate solution ($Na_2O=9.0$ wt. % and $SiO_2=28.8$ wt. %) and the remaining water were mixed together.

c. Seeds of Example 1 (1) and (4) were blended into the silicate-water mixture.

d. Finally, the sodium aluminate solution was added with thorough mixing.

e. The mixture was transferred to a two liter resin kettle, heated by a heating mantle and fitted with a reflux condenser, as the NaA synthesis slurries described above in Example 9.

f. After the mixture was heated to 100° C.±2° C. with rapid stirring, stirring was continued for only 15-30 minutes more. Then the stirrers were turned off during the crystallization of the NaY at reflux.

($Al_2O_3$ mol percent basis). The sodium silicate, sodium aluminate and aluminum sulfate solutions were the same as those used in Example 9.

| Example | Seeds $Al_2O_3$ (mols) | Slurry Chemicals ||||| Hours At 100° C. | $N_2$ Surface Area, $m^2/g$ | Percent Cryst. | Unit Cell Size, A. |
|---|---|---|---|---|---|---|---|---|---|---|
| | | Seeds, g. | Sodium Silicate Soln., g. | Sodium Aluminate Soln., g. | Water, g. | Aluminum Sulfate Soln., g. | | | | |
| 11A | 2 | 146 | 1348 | 253 | 456 | 270 | 10 | 839 | 89 | 24.64 |
| 11B | 4 | 92 | 1371 | 263 | 496 | 247 | 10 | 837 | 92 | 24.66 |
| 11C | 6 | 62 | 1383 | 268 | 513 | 234 | 10 | 796 | 98 | 24.64 |

EXAMPLE 12

NaX was made from slurries employing the oxide ratio $3.3Na_2O:1Al_2O_3:4.1SiO_2:122H_2O$ seeded with nucleation centers slurry using the general process of Example 1 (3), (4) and (5).

The slurries were mixed in the same two liter resin kettles fitted with condensers as used for the synthesis of NaY in Examples 10 and 11. The chemicals used to make the slurry were mixed in the following order:

a. sodium silicate solution plus sodium hydroxide solution made by dissolving the required amount (see table) of sodium hydroxide in water;

b. then seeds slurry blended in;

c. lastly, the sodium aluminate solution was added with vigorous stirring;

d. slurry was heated in its two liter resin kettle by means of a heating mantle and rapidly stirred until it had refluxed for 15 minutes; then the stirrer was turned off.

Excellent quality NaX forms in two hours from these slurries.

| Example | Seeds $Al_2O_3$ (Mols) | % Seeding (Mol % $Al_2O_3$) | Slurry Chemicals ||||| Hours At 100° C. | Nitrogen Surface Area, $m^2/g$ | Percent Crystallinity | Unit Cell Size, A. |
|---|---|---|---|---|---|---|---|---|---|---|---|
| | | | Seeds, g. | $Al_2O_3 \cdot 3H_2O$, g. | Sodium Silicate Soln., g. | Water, g. | NaOH, g. | | | | |
| 10A | 2 | 10 | 128 | 46 | 1048 | 890 | 43 | 4 | 865 | 88 | 24.67 |
| 10B | 6 | 6 | 28 | 48 | 1090 | 962 | 55 | 6 | 830 | 98 | 24.66 |

| Example | Seeds $Al_2O_3$ (mols) | % Seeding | Slurry Chemicals ||||| Hours At 100° C. | NaX Properties |||
|---|---|---|---|---|---|---|---|---|---|---|---|
| | | | Seeds, g. | Sodium Aluminate Soln., g. | Sodium Silicate Soln., g. (1) | Water, g. | NaOH, g. | | $N_2$ Surface Area $m^2/g$ | % Crystallinity | Unit Cell Size, A |
| 12A | 4 | 6 | 91 | 383 (2) | 605 | 969 | 24 | 2 | 827 | 98 | |
| 12B | 6 | 6 | 63 | 368 (3) | 617 | 982 | 32 | 2 | 815 | 98 | 24.88 |
| 12C | 8 | 6 | 48 | 368 (3) | 622 | 991 | 33 | 2 | 724 | 91 | 24.88 |
| 12D | 8 | 12 | 96 | 344 (3) | 605 | 984 | 33 | 2 | 786 | 100 | 24.87 |

Notes
(1) Sodium silicate solution: $Na_2O = 9.0\%$ and $SiO_2 = 28.8\%$.
(2) Sodium aluminate solution: $Na_2O = 18.4\%$ and $Al_2O_3 = 18.8\%$.
(3) Sodium aluminate solution: $Na_2O = 18.1\%$ and $Al_2O_3 = 19.6\%$.

EXAMPLE 11

NaY was made from 3.1:1:9:130 seeded slurries, which was mixed in much the same manner as in Example 10, but with the addition of aluminum sulfate solution with thorough mixing after the addition of sodium aluminate solution in step d. However, the sodium aluminate solutions used for the 9:1 slurries were premixed. The 9:1 slurries yield very good faujasite of the NaY type when seeded with 2, 4 or 6 $Al_2O_3$ seeds of Example 1 (1), (3) and (4). All three were 6 percent seeded The above examples indicate that the presently contemplated zeolite forming seeds compositions may be used to quickly and efficiently produce a variety of crystalline alumino-silicate zeolites.

We claim:

1. A method for preparing a crystalline aluminosilicate zeolite-forming seed composition having the mol ratio formula:

$16Na_2O:2$ to $9Al_2O_3:15SiO_2:500$ to $2000H_2O$ which comprises:

(a) mixing a sodium aluminate solution with a sodium silicate solution to obtain a gel having the following mol ratio formula:

$16Na_2O:2$ to $9Al_2O_3:15SiO_2:300$ to $340H_2O$;

(b) agitating and reacting the gel obtained in step (a) at a temperature of from about 10° to 80° C. for about ¼ to 96 hours; and (c) adding water to the gel obtained in step (b) with agitation to obtain a homogenous fluid seed composition having the mol ratio formula:

$16Na_2O:2$ to $9Al_2O_3:15SiO_2:500$ to $2000H_2O$.

2. The method of claim 1 wherein the homogenous mixture of step (c) is held at a temperature of 10° to 60° C. for about ¼ to 96 hours.

3. An aluminosilicate zeolite-forming seed composition obtained by the process of claim 1.

* * * * *